July 10, 1962 H. W. NORRIS 3,043,396
DEMOUNTABLE STEPS AND PLATFORMS FOR MOBILE HOMES
Filed March 18, 1959 3 Sheets-Sheet 2
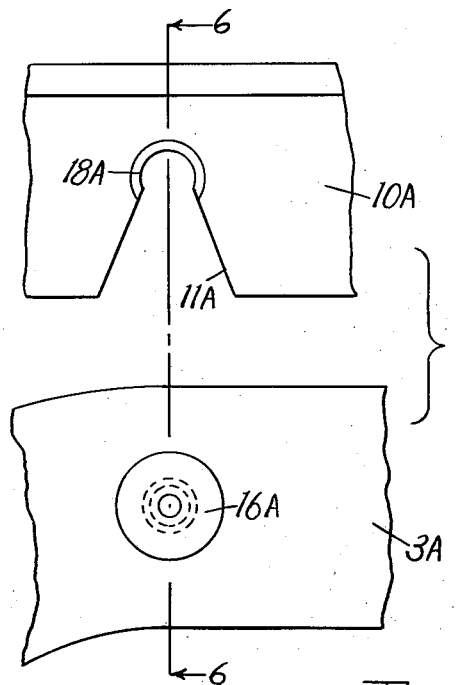
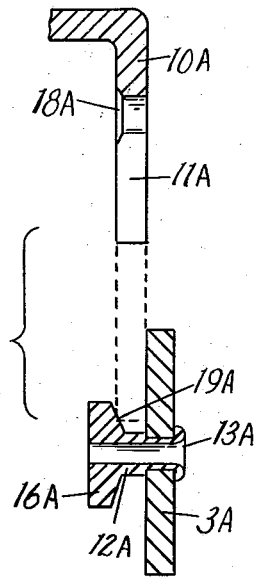
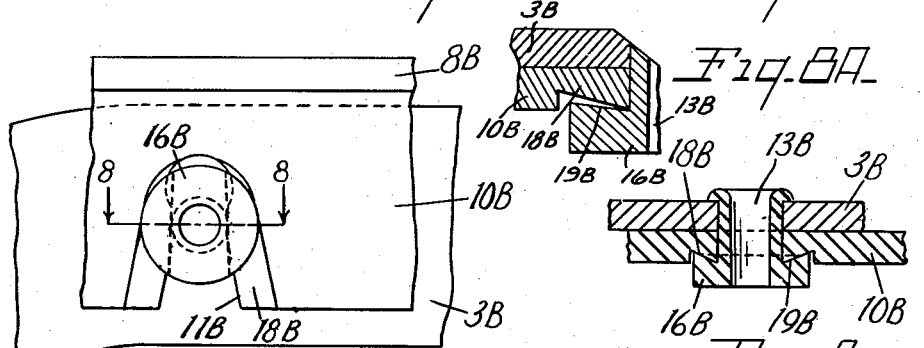
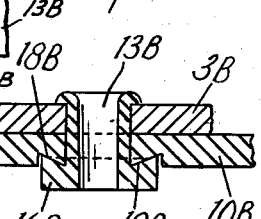
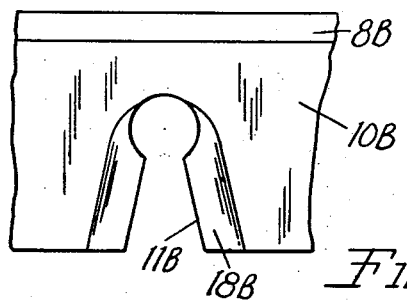
INVENTOR.
Harold W Norris
BY
ATTORNEY July 10, 1962 H. W. NORRIS 3,043,396
DEMOUNTABLE STEPS AND PLATFORMS FOR MOBILE HOMES
Filed March 18, 1959 3 Sheets-Sheet 3

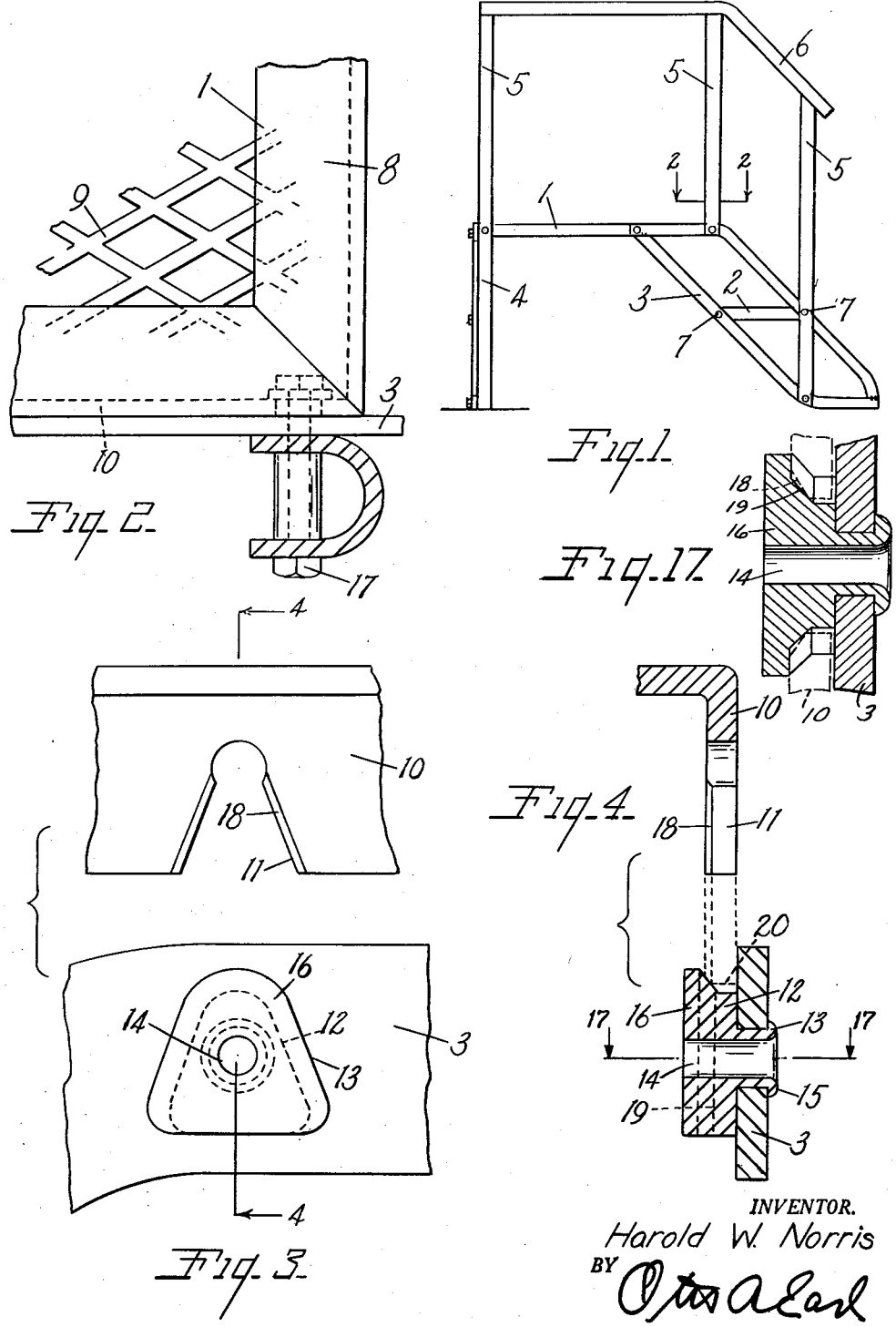

INVENTOR.
Harold W. Norris
BY
ATTORNEY

United States Patent Office 3,043,396
Patented July 10, 1962

3,043,396
DEMOUNTABLE STEPS AND PLATFORMS FOR MOBILE HOMES
Harold W. Norris, 12–18 Sylvan Ave., Battle Creek, Mich.
Filed Mar. 18, 1959, Ser. No. 800,290
14 Claims. (Cl. 182—106)

This invention relates to improvements in demountable steps and platforms for mobile homes. The principal objects of this invention are:

First, to provide a demountable porch and step assembly for trailer homes which can be easily disassembled for loading into the trailer and easily erected for use alongside or in front of the trailer door.

Second, to provide a demountable step and platform structure which requires a minimum of connecting bolts that have to be tightened and unscrewed in assembling and disassembling the platform and which remains firmly connected without tilting when in use.

Third, to provide a mobile platform and step structure with hook and pin connections between the elements of the structure that are easily assembled simply by engaging the hook elements over and behind the pin elements and in which the hook and pin parts of the connections form coacting cammed surfaces wedging the elements tightly together.

Fourth, to provide a demountable platform and step structure having hook and pin connections between its elements in which the pin parts of the connections are hollow and adapted to receive bolts for selectively connecting a hand rail support to the structure.

Fifth, to provide a novel form of hook and pin or stud connection between two demountable members in which the stud and hook have vertically and horizontally extending interlocking surfaces with opposed cammed faces disposed at slightly different angles so that engagement of the hook and stud elements causes frictional gripping contact between the elements that resists disengagement of the connected members.

Sixth, to provide a hook and stud connection having interlocking cammed surfaces angled with respect to each other in three coordinate planes to assure tight engagement between the members under the influence of work loads applied to the connected members.

Other objects and advantages of the invention will be apparent from a consideration of the following description and claims. The drawings, of which there are three sheets, illustrate a highly practical form of platform and step structure connected according to the invention and four modified forms of the connection between the elements of the platform.

FIG. 1 is a side elevational view of a small porch and step structure adapted to for use with trailer homes and embodying the releasable connections of the invention.

FIG. 2 is a fragmentary enlarged cross sectional view taken along the plane of the line 2—2 in FIG. 1.

FIG. 3 is a fragmentary composite or exploded view of the platform and support elements of the structure illustrated in disassembled relation and in elevational view.

FIG. 4 is a fragmentary transverse cross sectional view taken along the plane of the line 4—4 in FIG. 3.

FIG. 5 is a fragmentary exploded elevational view similar to FIG. 3 but illustrating a modified form of supporting connection between the members.

FIG. 6 is a transverse cross sectional view taken along the plane of the line 6—6 in FIG. 5.

FIG. 7 is a fragmentary inside elevational view of a further modified form of the connection between the platform and step elements with their parts in assembled condition.

FIG. 7A is a fragmentary elevational view of the supported platform or tread shown in FIGS. 7 and 8.

FIG. 8 is a fragmentary transverse cross sectional view taken along the plane of the line 8—8 in FIG. 7.

FIG. 8A is a fragmentary cross sectional view showing part of FIG. 8 at an enlarged scale.

FIG. 17 is a fragmentary horizontal cross sectional view taken along the plane of the line 17—17 in FIG. 4.

Figure 9:
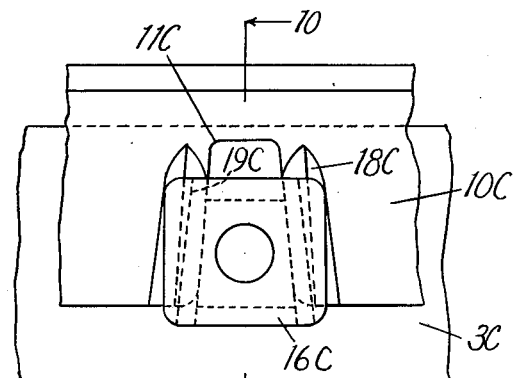
FIG. 9 is a fragmentary inside elevational view similar to FIG. 7 but illustrating a further modified form of the releaseable connection between the elements of the platform.
Figure 10:
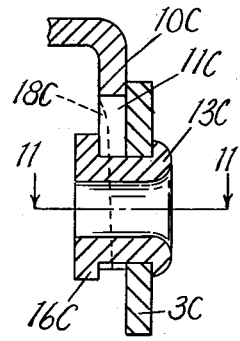
FIG. 10 is a fragmentary transverse cross sectional view taken along the plane of the line 10—10 in FIG. 9.

Demountable platforms and steps for mobile homes are generally old. It is a primary object of such platforms and steps to provide a sufficiently solid or rigid step and platform for easily entering into the trailer while permitting easy assembly and disassembly of the stair and platform so that it can be loaded into the trailer whenever the trailer is moved. Ordinary bolted connections between the elements of the platform, step and supporting elements permit the assembly to be disassembled, but are inconvenient in that quite a number of bolt connections must be made or removed and the connections are apt to loosen and permit the assembly to wobble unpleasantly or even unsafely in long periods of use. The present invention provides a demountable platform and step structure with a novel form of hook and stud connection between its elements which is easily assembled simply by dropping the hook elements over a projecting stud or vice versa. The necessary rigidity of the structure is provided by novel coacting cammed surfaces on the connected members.

FIG. 1 generally and conventionally illustrates a porch and step assembly consisting of a relatively broad platform 1 and a step or tread 2. The outer or front end of the platform and the tread 2 are supported by side support frames 3 of welded strip steel. Separate legs 4 support the rear edge of the platform. Where desired uprights or supports 5—5 for a hand rail 6 may be attached to the platform assembly on either or both sides thereof. The connections between the supporting and supported parts of the platform assembly are indicated conventionally at 7.

FIG. 2 discloses in greater detail and in plan view the connection between the front corner of the platform 1, the side support 3 and one of the uprights 5. The platform 1 which is in effect an extra wide step or tread consists of a supporting border rim 8 of angular cross section with an open mesh deck or platform 9 secured to the underside of its horizontal flange. The vertical flange 10 along the side of the border rim 8 defines a downwardly diverging notch 11 forming a hook that fits over the shank 12 of a pin or stud 13 carried by the support member 3. The pin 13 is hollow or tubular with a hole 14 formed therethrough and is secured to the support 3 by having its end riveted over as at 15 to tightly clamp the shank 12 against the inner side of the support. An enlarged head 16 on the inner end of the shank 12 hooks behind the inner side of the flange 10. The hole 14 in the stud provides space for selectively passing a bolt 17 therethrough for clamping the support 5 to the platform.

With particular reference to FIGS. 3 and 4 and 17 it will be noted that the inner side edges of the notch 11 are beveled or cammed as at 18 and that the outer opposed surfaces of the head 16 are oppositely cammed as at 19. The sides of the shank 12 and the adjacent sides of the head 16 are tapered correspondingly to the angle of the notch 11 but at a slightly greater angle so that as the cam surfaces 19 engage the cam surfaces 18, there is a wedging action transversely of the shank 12 which prevents the top of the shank 12 from seating completely to the top of the notch 11 as is indicated by the dotted line at 20 in FIG. 4. Simultaneously the axial inclination of the cammed surfaces 18 and 19 with respect to the axis of the studs 13 causes the flange 10 on the platform rim to be squeezed into tight frictional supporting engagement with the side of the support member 3. Desirably the transverse angle of the cammed surfaces 18 outwardly from the plane of the inside of the flange 10 is slightly less than the corresponding angle of the beveled surfaces 19 so that there is a further wedging action as the more sharply tapered axial bevel 19 attempts to enter into the more broadly beveled surface 18.

With the foregoing hook and pin connection the platform 1 and tread 2 with their hooked flanges are merely lowered downwardly over the pins or studs on the supporting members and the weight of the supported platform and tread immediately causes locking engagement between the members. A light tap with a hammer or a weight applied to the platform and step merely seats the connection more firmly and the tight frictional engagement created by the interlocked cammed surfaces prevents disengagement of the connections even though an uneven support on the ground might cause an upward disengaging force in one part of the platform when it is stepped on at another point. A sharp blow with a hammer on the under side of the rim flange 10 serves to disengage the connections when it is desired to disassemble the platform and step. The individual parts of the platform and step can be made of relatively heavy and rigid stock because it is unnecessary to handle all of the parts at one time during assembly or disassembly of the platform.

FIGS. 5 and 6 illustrate a modified form of connection in which the border flange 10A is provided with a notch 11A, however, instead of being beveled or cammed along the side edges of the notch a semi-circular conical cam 18A is formed around the upper apex of the notch 11A. The coacting support member 3A carries a pin or stud 13A having a circular shank 12A and an enlarged circular head 16A. The rear or inner surface of the head 16A is tapered conically as at 19A and the cam formed by the surface 19A coacts with the surface 18A to force the flange 10A into tight engagement with the support 3A and to support the rim above the shank 12A. The construction shown in FIGS. 5 and 6 has the advantage that the studs 13A and their conical surfaces 19A are completely symmetrical and can be installed in any angularly rotated position in the support element 3A.

FIGS. 7, 7A and 8 illustrate a further modified form of the releasable connection embodying features of both previous connections. The flange 10B of the rim element 8B defines an upwardly converging downwardly opening notch 11B. The inner side of the flange 10B along both edges of the notch 11B is inclined both laterally and axially with the axial inclination being laterally outwardly from the notch and axially away from the inner surface of the flange 10B as at 18B. The support element 3B carries a hollow tubular pin or stud 13B having an enlarged circular head 16B on its inner end. The rear side of the head 16B is cammed or beveled axially and laterally outwardly as at 19B at approximately the same but slightly greater angle than the beveled surface 18B on the border flange. The beveled surfaces 19B extend in converging chordal relation along opposite sides of the shank of the stud. Desirably the angle of convergence of the surfaces 19B is slightly greater than the angle of convergence of the surfaces 18B so that a similar wedging action to that in FIGS. 4 and 6 is achieved. FIG. 8A shows the angular relation of the cammed surfaces at a larger scale.

FIGS. 9 to 16 illustrate another form of releasable connection in which the support element C carries a hollow pin or stud 13C having a shank 12C and enlarged head 16C. The stud and its head and shank are generally rectangular and the portion of the stud which goes through the support member is received in a correspondingly rectangular hole in the support member to properly orient the stud with respect thereto. The vertically enlarged or extended ends of the shank 12C determine the spacing of the head from the opposed inner face of the support member 3C. The side edges of the head 16C define upwardly converging transversely convex angled cams 19C that decrease in height toward their upper ends as appears most clearly in FIG. 15. The angled cams 19C are received in and coact with concave angled grooves or cams 18C formed along the sides of a notch 11C in the border flange 10C. As appears most clearly in FIG. 13, the cam grooves 18C taper or decrease in depth upwardly along the border member.

Figure 12:
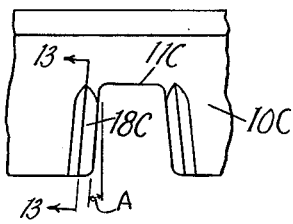
FIG. 12 is a fragmentary inside elevational view of the supported tread element appearing in FIGS. 9, 10 and 11 and illustrating the cammed surfaces thereon.
Figure 13:
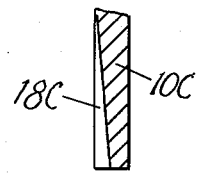
FIG. 13 is a fragmentary cross sectional view taken along the plane of the line 13—13 on FIG. 12.
Figure 14:
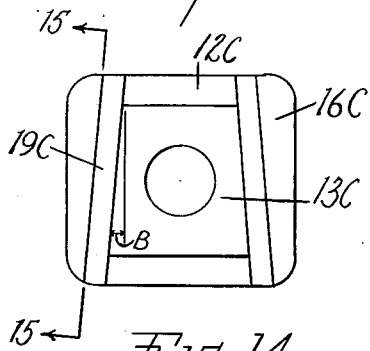
FIG. 14 is an end elevational view of the pin or stud shown in FIGS. 9, 10 and 11.
Figure 16:
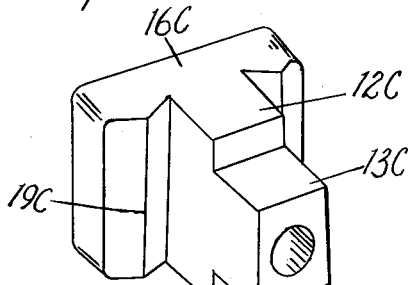
FIG. 16 is a perspective view of the stud shown in FIG. 14 prior to its assembly into the platform structure.
Figure 15:
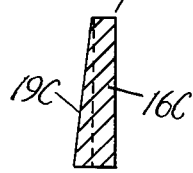
FIG. 15 is a cross sectional view through the cammed surface of the stud taken along the plane of the line 15—15 in FIG. 14.

The lateral angle of divergence of the grooves 18C indicated at A in FIG. 12 is of the order of 3° while the corresponding angle of divergence of the convex cams 19C as indicated at B in FIG. 14 is desirably slightly greater and of the order of 4° so that there is a wedging action as the cams 19C move upwardly into the grooves 18C.

Figure 11:
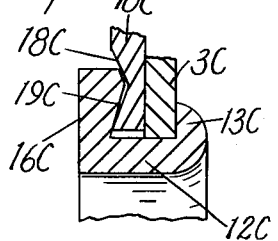
FIG. 11 is a fragmentary horizontal cross sectional view taken along the plane of the line 11—11 in FIG. 10.

As appears most clearly in FIG. 11 the transverse angle of the cam grooves 18C in the border rim are slightly narrower or at a lesser angle than the angle of the cooperating convex cams 19C on the stud head. This causes a still further weighting action as the supported elements of the platform are pressed downwardly onto the supporting elements thereof.

In all forms of the step and platform and the releaseable connections therebetween, the beveled cam surfaces on the supported and supporting members are formed by a coining or stamping operation so that the relative angles of the several parts can be easily controlled. Further the coining operation hardens the surfaces of the cams formed and makes them resistant to wear although frictional wear is not a major consideration.

What is claimed as new is:

1. In a demountable platform having a flat tread with a supporting rim member and upright support members disposed at the sides of said rim member, a releasable supporting connection between said members comprising horizontally projecting studs on said supporting members and coacting downwardly opening notches in the rim of the tread member, said studs having hollow shanks fixedly riveted to their supporting member and having enlarged heads spaced from the supporting member, said members with the notches therein being received between said heads and the sides of the members to which the studs are connected, said shanks and said notches being relatively tapered to facilitate entry of the shanks into the notches, first vertically converging cam surfaces formed on laterally opposite sides of the inner surface of said heads and inclined axially with respect to said shanks, other coacting vertically converging cam surfaces formed on the surface of said notched member opposed to said heads and inclined with respect to said shanks oppositely to said first cam surfaces, the angle of convergence of said first cam surfaces being of the order of 4°, the angle of convergence of said other of said cam surfaces being slightly greater than the convergence of said first surfaces by the order of 1°, said first cam surfaces being inclined laterally at an angle of the order of 4°, said other cam surfaces being inclined laterally at an angle somewhat less than lateral angle of said first cam surfaces by the order of 1°, said first and second cam surfaces tapering longitudinally of their length, the length of said shank being less than the thickness of said member with the notch therein whereby said cam surfaces hold said members laterally together without contact between the shank and the base of said notch, and a hand rail support detachably secured to the side of said platform by bolts passed through the hollow shanks of said studs.

2. In a demountable platform having a flat tread with a supporting rim member and upright support members disposed at the sides of said rim member, a releasable supporting connection between said members comprising horizontally projecting studs on one of said members and coacting notches in the other of said members engaged therewith, said studs having hollow shanks fixedly riveted to their supporting member and having enlarged heads spaced from their supporting member, said members with the notches therein being received between said heads and the sides of the members to which the studs are connected, said shanks and said notches being relatively tapered to facilitate entry of the shanks into the notches, first vertically converging cam surfaces formed on laterally opposite sides of the inner surface of said heads and inclined axially with respect to said shanks, other coacting vertically converging cam surfaces formed on the surface of said notched member opposed to said heads and inclined with respect to said shanks oppositely to said first cam surfaces, the angle of convergence of said first cam surfaces being of the order of 4°, the angle of convergence of said other of said cam surfaces being slightly greater than the convergence of said first surfaces, said first cam surfaces being inclined laterally, said other cam surfaces being inclined laterally at an angle somewhat less than lateral angle of said first cam surfaces, said first and second cam surfaces tapering longitudinally of their length, the length of said shank being less than the thickness of said member with the notch therein whereby said cam surfaces hold said members laterally together without contact between the shank and the base of said notch, and a hand rail support detachably secured to the side of said platform by bolts passed through the hollow shanks of said studs.

3. In a demountable platform having a flat tread with a supporting rim member and upright support members disposed at the sides of said rim member, a releasable supporting connection between said members comprising horizontally projecting studs on one of said members and coacting notches in the other of said members engaged therewith, said studs having hollow shanks fixedly riveted to said one member and having enlarged heads spaced from said one member, the other of said members with the notches therein being received between said heads and the sides of the members to which the studs are connected, first vertically converging cam surfaces formed on laterally opposite sides of the inner surface of said heads and inclined axially with respect to said shanks, other coacting vertically converging cam surfaces formed on the surface of said notched member opposed to said heads and inclined with respect to said shanks oppositely to said first cam surfaces, the angle of convergence of said other of said cam surfaces being slightly greater than the convergence of said first surfaces, said first and second cam surfaces tapering longitudinally of their length, the length of said shank being less than the thickness of said member with the notch therein whereby said cam surfaces hold said members together without contact between the shank and the base of said notch, and a hand rail support detachably secured to the side of said platform by bolts passed through the hollow shanks of said studs.

4. In a demountable platform having a flat tread with a supporting rim member and upright support members disposed at the sides of said rim member, a releasable supporting connection between said members comprising horizontally projecting studs on one of said members and coacting notches in the other of said members engaged therewith, said studs having hollow shanks fixedly riveted to said one member and having enlarged heads spaced from said one member, the other of said members with the notches therein being received between said heads and the sides of the members to which the studs are connected, first vertically converging cam surfaces formed on laterally opposite sides of the inner surface of said heads and inclined axially with respect to said shanks, other coacting vertically converging cam surfaces formed on the surface of said notched member opposed to said heads and inclined with respect to said shanks oppositely to said first cam surfaces, the length of said shank being less than the thickness of said member with the notch therein whereby said cam surfaces hold said members together without contact between the shank and the base of said notch, and a hand rail support detachably secured to the side of said platform by bolts passed through the hollow shanks of said studs.

5. In a demountable platform having a flat tread with a supporting rim member and upright support members disposed at the sides of said rim member, a releasable supporting connection between said members comprising horizontally projecting studs on one of said members and coacting notches in the other of said members engaged therewith, said studs having hollow shanks fixedly riveted to said one member and having enlarged heads spaced from said one member, said member with the notches therein being received between said heads and the sides of the members to which the studs are connected, said shanks and said notches being relatively tapered to facilitate entry of the shanks into the notches, first vertically converging cam surfaces formed on laterally opposite sides of the inner surface of said heads, other coacting vertically converging cam surfaces formed on the surface of said notched member opposed to said heads, the angle of convergence of said other of said cam surfaces being slightly greater than the convergence of said first surfaces, the length of said shank being less than the thickness of said member with the notch therein whereby said cam surfaces hold said members laterally together without contact between the shank and the base of said notch, and a hand rail support detachably secured to the side of said platform by bolts passed through the hollow shanks of said studs.

6. A releasable supporting connection between a supporting member and a supported member comprising horizontally projecting studs on one of said members and coacting notches in the other of said members engaged therewith, said studs being hollow from end to end and having hollow shanks fixedly riveted to said one member and having enlarged heads spaced from said one member, said member with the notches therein being received between said heads and the sides of the members to which the studs are connected, said shanks and said notches being relatively tapered to facilitate entry of the shanks into the notches, first vertically converging cam surfaces formed on laterally opposite sides of the inner surface of said heads, and other coacting vertically converging cam surfaces formed on the surface of said notched member opposed to said heads, the length of said shank being less than the thickness of said member with the notch therein whereby said cam surfaces hold said members laterally together without contact between the shank and the base of said notch.

7. A releasable supporting connection between a supporting member and a supported member comprising horizontally projecting studs on said supporting members and coacting downwardly opening notches in said supported member, said studs being hollow from end to end and having non-circular hollow shanks fixedly riveted to their supporting member and having enlarged heads spaced from the supporting member, said members with the notches therein being received between said heads and the sides of the members to which the studs are connected, first vertically converging cam surfaces formed on laterally opposite sides of the inner surface of said heads and inclined axially with respect to said shanks, and other coacting vertically converging cam surfaces formed on the surface of said notched member opposed to said heads and inclined with respect to said shanks oppositely to said first cam surfaces, the angle of convergence of said other of said cam surfaces being slightly greater than the convergence of said first surfaces, said first cam surfaces being inclined laterally, said other cam surfaces being inclined laterally at an angle somewhat less than lateral angle of said first cam surfaces, the length of said shank being less than the thickness of said member with the notch therein whereby said cam surfaces hold said members laterally together without contact between the shank and the base of said notch.

8. A releasable supporting connection between a supporting member and supported member comprising horizontally projecting studs on said supporting members and coacting downwardly opening notches in said supported member, said studs being hollow from end to end and having non-circular hollow shanks fixedly riveted to their supporting member and having enlarged heads spaced from the supporting member, said members with the notches therein being received between said heads and the sides of the members to which the studs are connected, first vertically converging cam surfaces formed on laterally opposite sides of the inner surface of said heads and inclined axially with respect to said shanks, and other coacting vertically converging cam surfaces formed on the surface of said notched member opposed to said heads and inclined with respect to said shanks oppositely to said first cam surfaces, said first cam surfaces being inclined laterally, said other cam surfaces being inclined laterally at an angle somewhat less than lateral angle of said first cam surfaces, the length of said shank being less than the thickness of said member with the notch therein whereby said cam surfaces hold said members laterally together without contact between the shank and the base of said notch.

9. A releasable supporting connection between a supporting member and a supported member comprising horizontally projecting studs on said supporting members and coacting downwardly opening notches in said supported member, said studs being hollow from end to end and having hollow shanks fixedly riveted to their supporting member and having enlarged heads spaced from the supporting member, said members with the notches therein being received between said heads and the sides of the members to which the studs are connected, said shanks and said notches being relatively tapered to facilitate entry of the shanks into the notches, a first conical cam surface formed on the inner surface of said heads and inclined axially with respect to said shanks, and another coacting semi-conical cam surface formed on the surface of said notched member around the apex of the notch therein and opposed to said heads and inclined with respect to said shanks oppositely to said first cam surface, said other cam surfaces being inclined laterally at an angle somewhat less than lateral angle of said first cam surface, the length of said shank being less than the thickness of said member with the notch therein whereby said cam surfaces hold said members laterally together without contact between the shank and the base of said notch.

10. A releasable supporting connection between a supporting member and a supported member comprising horizontally projecting studs on said supporting members and coacting downwardly opening notches in said supported member, said studs being hollow from end to end and having hollow shanks fixedly riveted to their supporting member and having enlarged heads spaced from the supporting member, said members with the notches therein being received between said heads and the sides of the members to which the studs are connected, said shanks and said notches being relatively tapered to facilitate entry of the shanks into the notches, a first conical cam surface formed on the inner surface of said heads and inclined axially with respect to said shanks, and another coacting semi-conical cam surface formed on the surface of said notched member around the apex of the notch therein and opposed to said heads and inclined with respect to said shanks oppositely to said first cam surface, the length of said shank being less than the thickness of said member with the notch therein whereby said cam surfaces hold said members laterally together without contact between the shank and the base of said notch.

11. A releasable supporting connection between a supporting member and a supported member comprising horizontally projecting studs on one of said members and coacting notches in the other of said members engaged therewith, said studs being hollow from end to end and having hollow shanks fixedly riveted to said one member and having enlarged heads spaced from said one member, the other of said members with the notches therein being received between said heads and the sides of the members to which the studs are connected, first vertically converging cam surfaces formed on laterally opposite sides of the inner surface of said heads and inclined axially with respect to said shanks and other coacting vertically converging cam surfaces formed on the surface of said notched member opposed to said heads and inclined with respect to said shanks oppositely to said first cam surfaces, the length of said shank between the head and said one member being less than the thickness of said member with the notch therein whereby said cam surfaces hold said members together without contact between the shank and the base of said notch.

12. A releasable supporting connection between a supporting member and a supported member comprising horizontally projecting studs on one of said members and coacting notches in the other of said members, said studs being hollow from end to end and having hollow shanks fixedly riveted to their supporting member and having enlarged heads spaced from the supporting member, said members with the notches therein being received between said heads and the sides of the members to which the studs are connected, a first conical cam surface formed on the inner surface of said heads and inclined axially with respect to said shanks, and another coacting semi-conical cam surface formed on the surface of said notched member around the apex of the notch therein and opposed to said heads and inclined with respect to said shanks oppositely to said first cam surface.

13. A releasable supporting connection between a supporting member and a supported member comprising horizontally projecting studs on one of said members and coacting notches in the other of said members engaged therewith, said studs being hollow from end to end and having hollow shanks fixedly riveted to said one member and having enlarged heads spaced from said one member, the other of said members with the notches therein being received between said heads and the sides of the members to which the studs are connected, first vertically converging cam surfaces formed on laterally opposite sides of the inner surface of said heads and inclined axially and radially inwardly from said heads to said shanks, and other coacting vertically converging cam surfaces formed on the surface of said notched member opposed to said heads and inclined with respect to said shanks oppositely to said first cam surfaces, the angle of convergence of said other of said cam surfaces being slightly greater than the convergence of said first surfaces.

14. A releasable supporting connection between a supporting member and a supported member comprising horizontally projecting studs on one of said members and coacting notches in the other of said members engaged therewith, said studs being hollow from end to end and having hollow shanks fixedly riveted to said one member and having enlarged heads spaced from said one member, said member with the notches therein being received between said heads and the sides of the members to which the studs are connected, first vertically converging cam surfaces formed on laterally opposite sides of the inner surface of said heads and inclined radially outwardly from said shanks and axially toward said one member, and other coacting vertically converging cam surfaces formed on the surface of said notched member opposed to said heads, the angle of convergence of said other of said cam surfaces being slightly greater than the convergence of said first surfaces.

References Cited in the file of this patent

UNITED STATES PATENTS

| | | |
|---|---|---|
| 475,164 | Sprague | May 17, 1892 |
| 591,960 | Dyer | Oct. 19, 1897 |
| 1,074,919 | Woelffel | Oct. 7, 1913 |
| 1,081,639 | Vail | Dec. 16, 1913 |
| 1,772,668 | Kusterle | Aug. 12, 1930 |
| 2,091,378 | Simpson | Aug. 31, 1937 |
| 2,448,817 | McArthur | Sept. 7, 1948 |
| 2,688,504 | Parker | Sept. 7, 1954 |
| 2,755,115 | Kollman | July 17, 1956 |
| 2,801,895 | Gass | Aug. 6, 1957 |
| 2,859,057 | Elsner | Nov. 4, 1958 |

FOREIGN PATENTS

| | | |
|---|---|---|
| 63,187 | Germany | July 7, 1892 |
| 141,242 | Great Britain | Apr. 15, 1920 |
| 354,058 | Great Britain | Aug. 6, 1931 |
| 734,513 | Great Britain | Aug. 3, 1955 |
| 752,576 | Great Britain | July 11, 1956 |